United States Patent [19]
Nichols

[11] Patent Number: 5,411,659
[45] Date of Patent: May 2, 1995

[54] REUSABLE LIQUID FILTERING SYSTEM

[76] Inventor: Bret E. Nichols, 8646 Mahogany Ct., Manassas, Va. 22110

[21] Appl. No.: 205,643

[22] Filed: Mar. 4, 1994

[51] Int. Cl.⁶ ............................................. B01D 27/10
[52] U.S. Cl. .................................... 210/130; 210/136; 210/223; 210/232; 210/444; 210/450; 210/453; 210/DIG. 17
[58] Field of Search ............... 210/130, 133, 136, 223, 210/232, 440, 443, 444, 450, 453, 493.2, DIG. 17

[56] References Cited

U.S. PATENT DOCUMENTS

| | | | |
|---|---|---|---|
| 3,036,711 | 5/1962 | Wilhelm | 210/130 |
| 3,305,095 | 2/1967 | Hathaway | 210/130 |
| 3,333,703 | 8/1967 | Scavuzzo et al. | 210/232 |
| 3,984,318 | 10/1976 | Bumb | 210/130 |
| 4,067,810 | 1/1978 | Sullivan | 210/223 |
| 4,622,136 | 11/1986 | Karcey | 210/168 |
| 5,066,391 | 11/1991 | Faria | 210/85 |

FOREIGN PATENT DOCUMENTS 2056873 3/1981 United Kingdom ................ 210/230

Primary Examiner—Matthew O. Savage
Attorney, Agent, or Firm—Donald A. Kettlestrings

[57] ABSTRACT

A reusable liquid filtering system and a disposable liquid filter used in the liquid filtering system are provided for use with an internal combustion engine or pump. The liquid filter includes first and second end members and a liquid bypass valve is connected to and projects outwardly from the first end member whereby excessive oil pressure will result in opening of the bypass valve so that an emergency oil flow bypass is thereby provided. The disposable liquid filter is removably positioned within a container of the reusable liquid filtering system. A base is removably connected to the engine or pump and to an open end of the container for allowing removal and replacement of the liquid filter and for allowing neat and spill-free drainage of oil from the container when the base and the container have been removed from the engine or pump and when the base has been removed from the container.

14 Claims, 5 Drawing Sheets

REUSABLE LIQUID FILTERING SYSTEM

BACKGROUND OF THE INVENTION

This invention relates to a reusable liquid filtering system and a disposable liquid filter for use in the filtering system and more particularly to a reusable liquid filtering system and a disposable liquid filter for use with an internal combustion engine or pump.

Disposable oil filters are widely known and used on vehicles and are typically used with internal combustion engines. When the disposable oil filter has become clogged or when its filtering properties are no longer effective, the entire filter unit is removed from the engine and discarded. Because of anti-drain back features of such disposable filter units, a significant amount of oil remains within the filter unit when it is discarded.

The discarded filter units are often dumped into landfills. As the discarded filter units decompose, the dirty oil retained within the units is released into the landfill. This oil then contaminates the ground and water in and around the landfill. The ground and water contamination is a serious and widespread problem because large numbers of disposable oil filter units are dumped into landfills, and large amounts of oil are released into the environment.

Various types of disposable liquid filter elements are known for use with reusable liquid filtering systems. After the filter element has been in use for a period of time, the gradual accumulation of contaminants in the filter element reduces the efficiency and effectiveness of the filtering system and provides increased resistance to oil flow through the filter element. If the resistance to oil flow reaches a predetermined level, existing liquid filtering systems are provided with a pressure sensitive bypass valve which is activated so that oil bypasses the filter element and is returned essentially unfiltered to the engine. Typically, these pressure sensitive bypass valves are relatively complex in configuration.

It is, therefore, an object of the present invention to provide a disposable liquid filter element which incorporates an oil bypass valve within the structure of the filter element.

Another object is to provide a disposable liquid filter element which incorporates a bypass valve that is relatively simple in construction.

A further object of the invention is the provision of a disposable liquid filter element which incorporates a bypass valve that is reliable in its operation.

Yet another object of the present invention is the provision of a reusable liquid filtering system for use with internal combustion engines or pumps.

A still further object is to provide a reusable liquid filtering system which can be quickly and easily attached to and removed from an internal combustion engine or pump.

A further object of the invention is the provision of a reusable liquid filtering system that can be operated at less expense than the typical prior art disposable filtering unit.

Another object is to provide a reusable liquid filtering system which incorporates a disposable and replaceable filter therein.

Another object is to provide a reusable liquid filtering system for use with an internal combustion engine or pump wherein oil within the filtering system can be completely, quickly and easily drained in a neat and clean manner.

Still another object is to provide a reusable liquid filtering system for use with an internal combustion engine or pump wherein the filtering system can be removed from the engine or pump in a neat and clean manner without spilling oil from within the liquid filtering system.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

SUMMARY OF THE INVENTION

To achieve these and other objects the present invention provides a disposable liquid filter which comprises: a first annular end member of predetermined material defining a first outer perimeter surface and an opposed first inner perimeter surface spaced apart from the first outer perimeter surface by a first predetermined distance, the inner perimeter surface defining a perimeter of a first interior opening; a second end member of predetermined material defining a second outer perimeter surface; the first end member further defining a first annular surface extending between the first outer perimeter surface and the first inner perimeter surface and a second opposed annular surface extending between the first outer perimeter surface and the first inner perimeter surface; the second end member further defining a third surface connected with the second outer perimeter surface and a fourth opposed surface connected with the second outer perimeter surface; a liquid bypass valve connected to and projecting outwardly from the first annular surface; and a substantially cylindrically configured filter material connected to and extending between the second annular surface and the fourth surface.

The invention further provides a reusable liquid filtering system for use with an internal combustion engine or pump, the system comprising: a container having a first closed end, a second opposed open end and defining a substantially cylindrical sidewall extending between the first and second ends; a first element projecting inwardly from the first closed end; a base having first and second opposed sides and defining a centrally positioned threaded oil return opening and a plurality of oil entry openings; a first annular gasket connected to the first side of the base and positioned to selectively engage the cylindrical sidewall of the container when the base is positioned over and against the second open end of the container; a plurality of third elements projecting from the first side of the base in spaced apart relationship with each other and positioned between the oil entry openings and the first gasket; a second annular gasket positioned on the second side of the base for engaging the engine or pump in liquid-tight sealing relationship; means in operative relationship with the container and with the base for removably connecting the base to the second open end of the container; and a disposable liquid filter element as previously described removably positioned within the container with the second end member of the filter element in substantially liquid-tight sealing relationship with the first element, with the third elements engaging the first end member of the filter element, and with the liquid bypass valve normally engaging the first side of the base in substantially liquid-tight sealing relationship when the base is connected to the second open end of the container by the connecting means.

It is to be understood that both the foregoing general description and the following detailed description are exemplary and explanatory but are not restrictive of the invention.

BRIEF DESCRIPTION OF THE DRAWINGS

The accompanying drawings, which are incorporated in and constitute a part of this specification, illustrate examples of preferred embodiments of the invention and, together with the description, serve to explain the principles of the invention.

DESCRIPTION OF THE PREFERRED EMBODIMENTS

Figure 1:
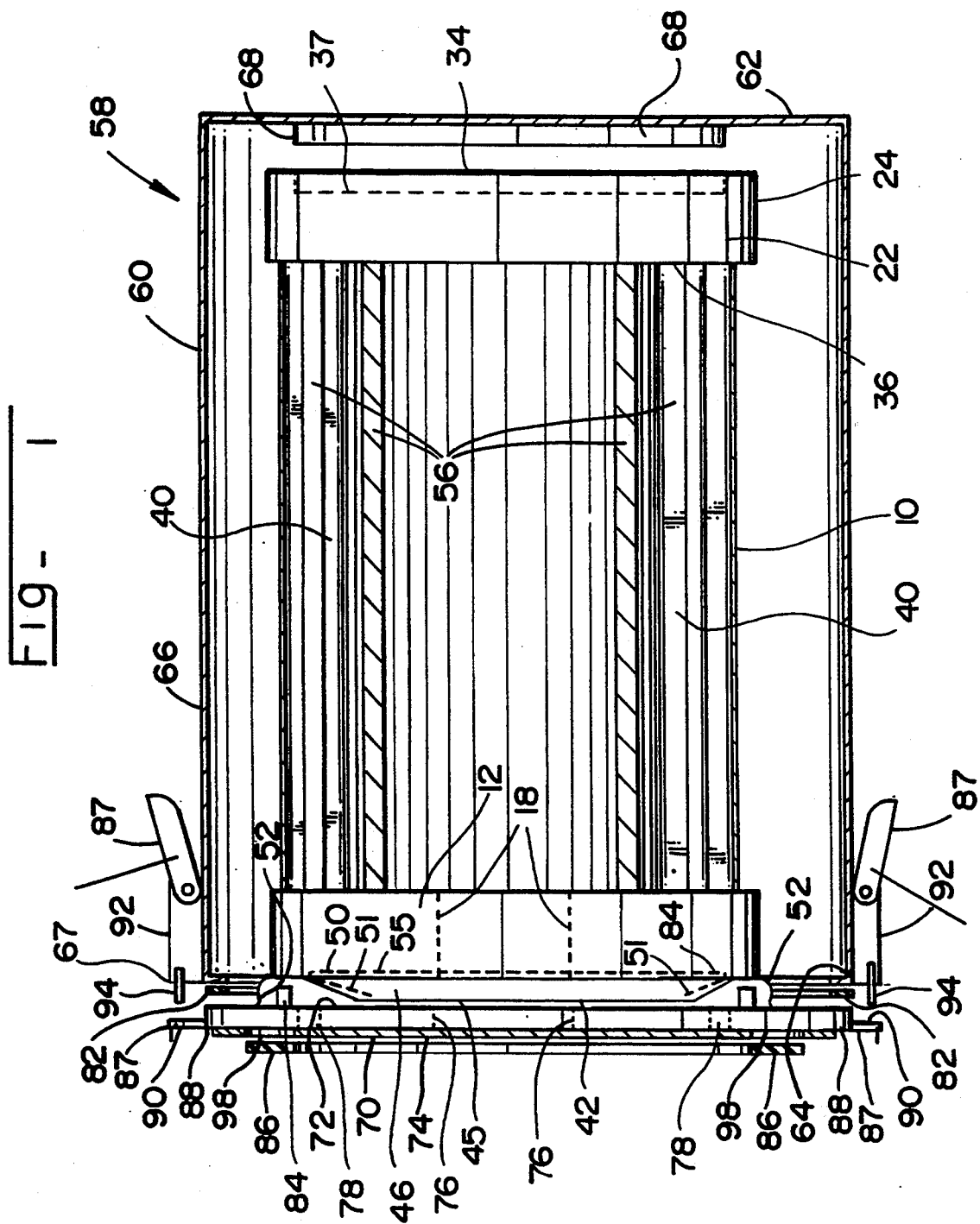
FIG. 1 is a cross-sectional view of the filtering system.

With reference now to the drawings, wherein like reference characters designate like or corresponding parts throughout the several views, there is shown a liquid filter element 10 in accordance with the invention. Liquid filter element 10 comprises a first annular end member 12 of a predetermined material, such as injection molded plastic, defining a first outer perimeter surface 14 and an opposed first inner perimeter surface 16 spaced apart from outer perimeter surface 14 by a first predetermined distance. Inner perimeter surface 16 defines a perimeter of a first interior opening 18 within annular end member 12.

Filter element 10 further includes a second end member 22 of predetermined material, such as injection molded plastic. End member 22 defines a second outer substantially circular perimeter surface 24, and end member 22 is preferably solid with no openings therethrough. End member 22 further defines a third surface 34 connected with perimeter surface 24 and a fourth opposed surface 36 connected with outer perimeter surface 24. An annular channel 37 is defined within surface 34.

First end member 12 further defines a first annular surface 30 which extends between first outer perimeter surface 14 and first inner perimeter surface 16. End member 12 also defines a second opposed annular surface 32 which extends between outer perimeter surface 14 and inner perimeter surface 16.

In accordance with the invention, a liquid bypass valve 38 is connected to and projects outwardly from annular surface 30 of end member 12. Valve 38 is connected to annular surface 30 around interior opening 18.

Bypass valve 38 includes a hollow conical frustum element 42 which defines first and second opposed open ends 44, 44'. A tapered sidewall 46 extends between open ends 44, 44', and frustum element 42 is connected at open end 44 thereof to annular surface 30 around interior opening 18. Frustum element 42 projects outwardly from annular surface 30 by a second predetermined distance, and sidewall 46 defines a plurality of openings 48 therein.

Bypass valve 38 further includes a spring member 50 connected to annular surface 30 and which defines a plurality of plastic or rubber coated tab elements 51 which project outwardly from annular surface 30 for normally resiliently engaging an inner surface 53 of sidewall 46 and covering openings 48 in substantially liquid-tight sealing relationship. Spring member 50 further includes an annular element 55 embedded within surface 30 of first end member 12, and annular element 55 is resiliently connected to each of tab elements 51.

A substantially cylindrically configured and pleated filter material 40 of conventional composition and configuration is connected to and extends between surfaces 32 and 36 in a conventional manner. In addition, a conventional perforated cylindrical center supports (not shown), made of plastic or metal, is positioned inside of filter material 40 to support filter material 40 and to prevent filter material 40 from tearing or bursting. The perforated cylindrical center support is connected to and extends between surfaces 32 and 36.

Filter element 10 further includes an annular flap member 52 which is flexibly connected to end member 12 and which projects beyond outer perimeter surface 14 by a third predetermined distance. Flap member 52 is preferably flexibly connected to an edge 54 which is defined by the intersection of perimeter surface 14 with surface 30.

Further in accordance with the invention, filter element 10 includes at least one magnetized rod element 56 which extends between and is connected to end members 12, 22 for attracting and holding ferrous metal particles and for providing filter element 10 with additional structural strength. Each of rod elements 56 is embedded into end members 12, 22 when end members 12, 22 are injection molded.

Replaceable filter element 10 is used as a component of a reusable liquid filtering system 58 which is used with an internal combustion engine or pump (not shown). In accordance with the invention, reusable liquid filtering system 58 comprises a container 60 having a first closed end 62 and a second opposed open end 64. Container 60 defines a substantially cylindrical sidewall 66 which extends between closed end 62 and open end 64. A first element 68 projects inwardly from closed end 62, and first element 68 is preferably configured as a continuous and substantially circular shape.

Figure 2:
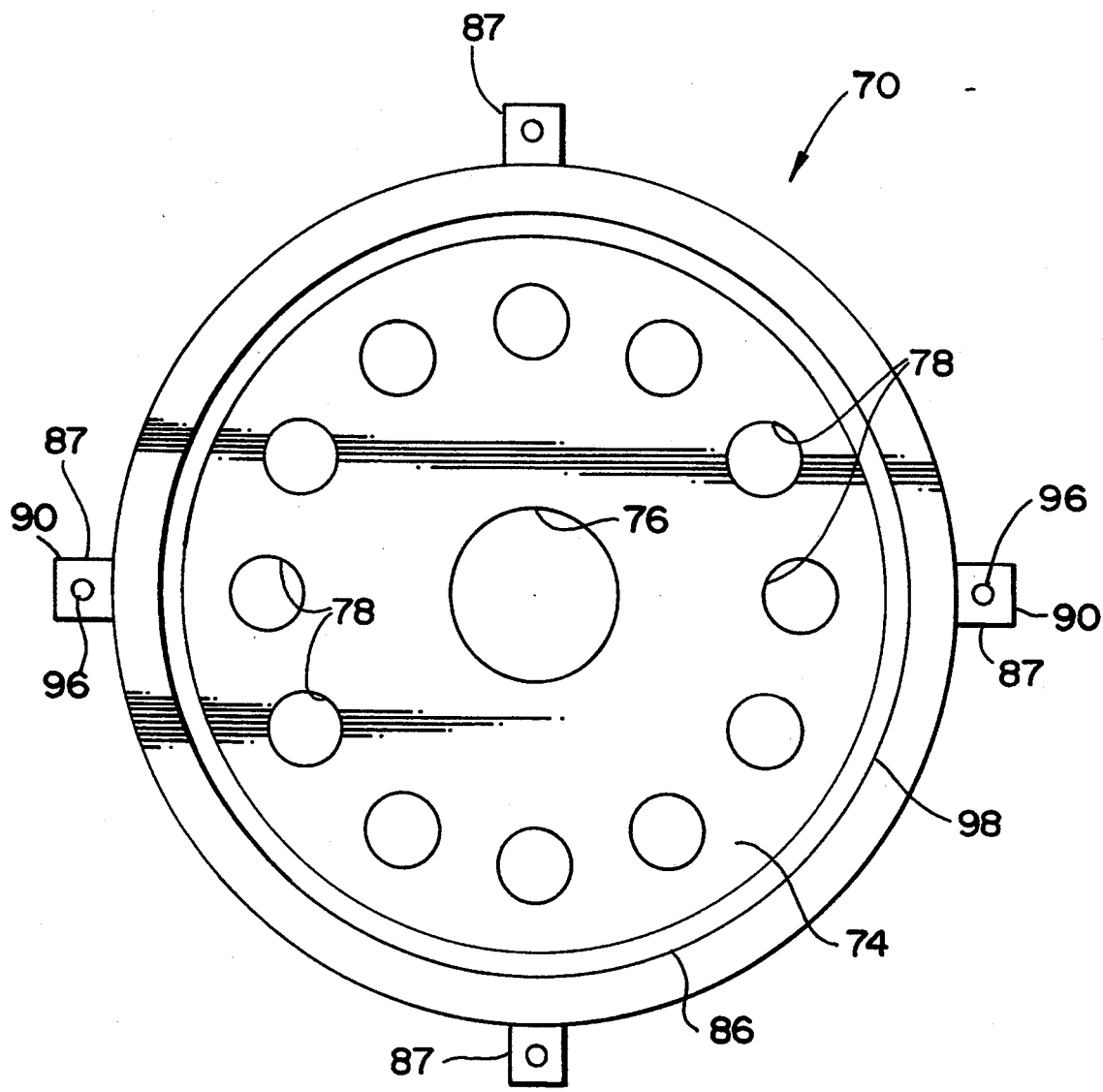
FIG. 2 is an end view of a side of the base of the filtering system.
Figure 3:
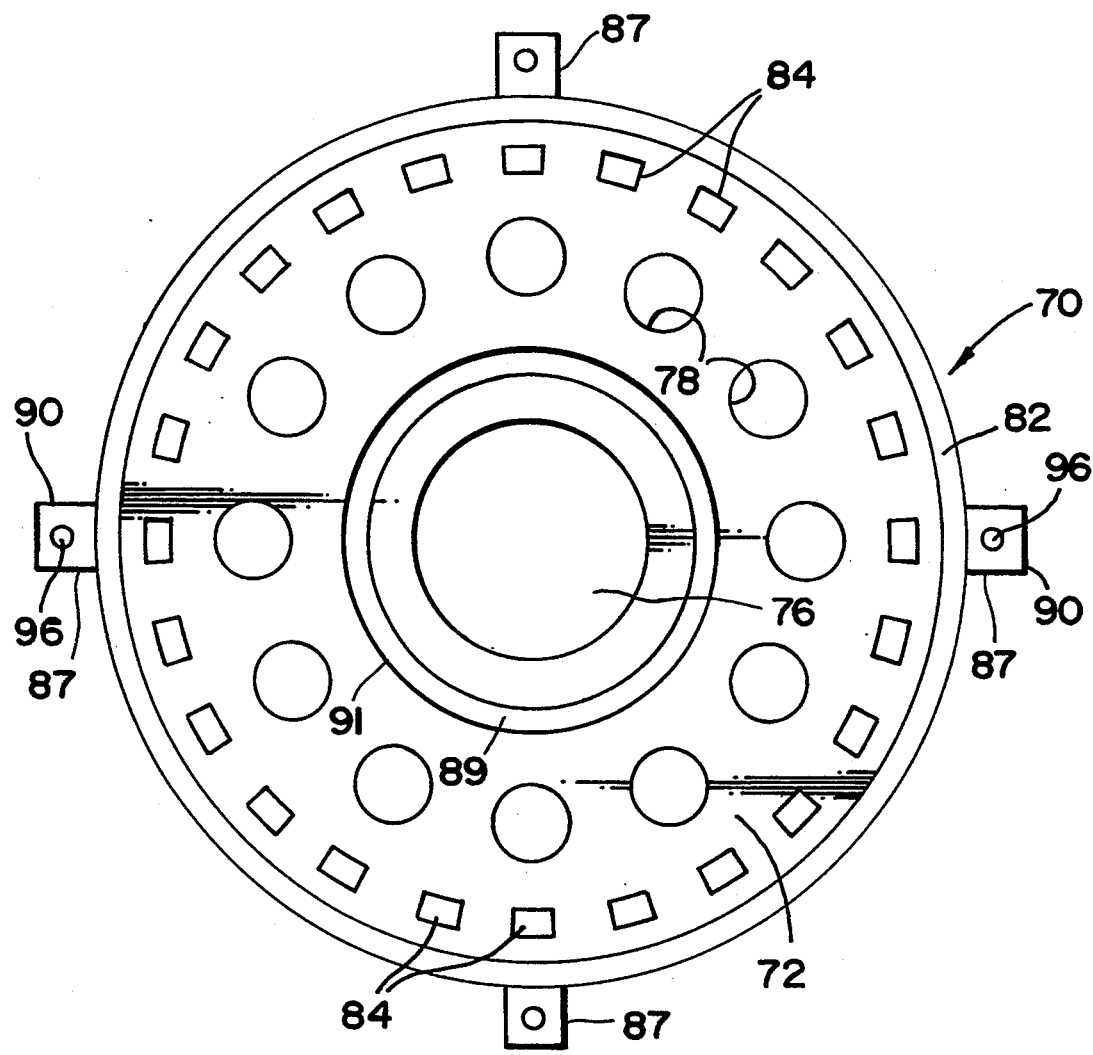
FIG. 3 is an end view of an opposite side of the base of the filtering system.
Figure 4:
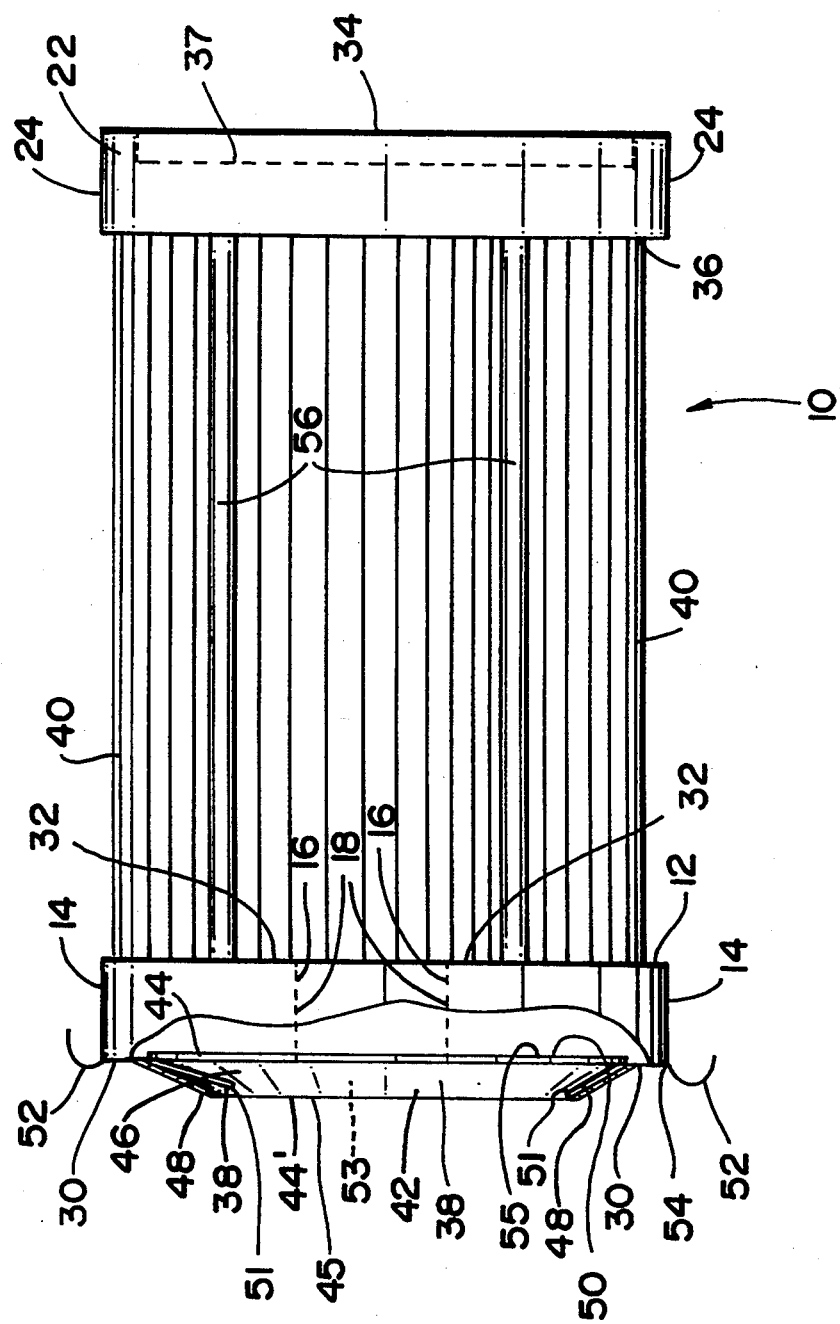
FIG. 4 is a side view of a disposable liquid filter for use with the filtering system.
Figure 5:
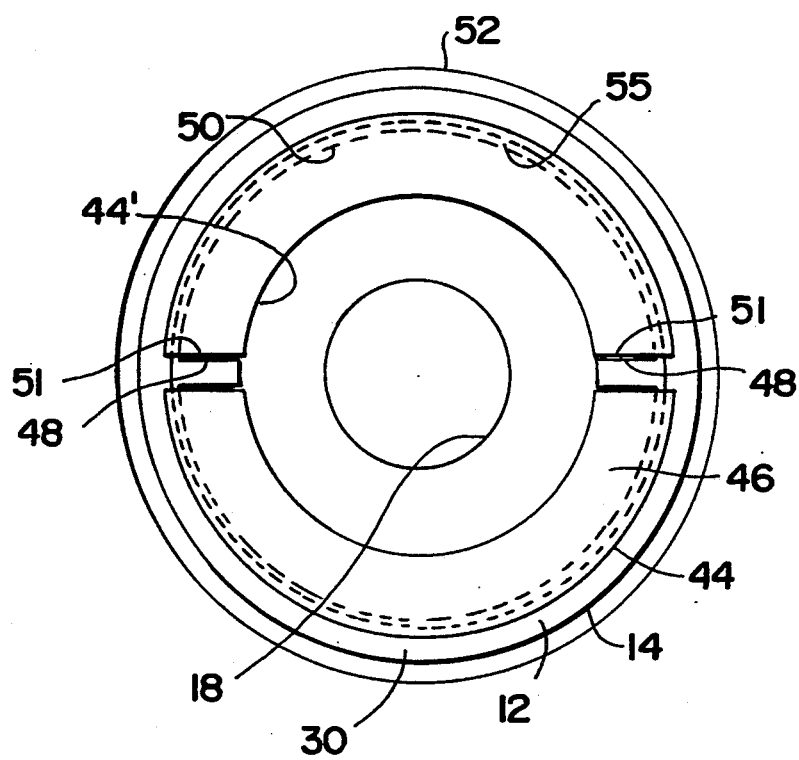
FIG. 5 is an end view of the disposable liquid filter.

Filtering system 58 further includes a base 70 having first and second opposed sides 72, 74, respectively. Base 70 defines a centrally positioned threaded oil return opening 76 and a plurality of oil entry openings 78. Openings 78 are spaced radially outwardly from oil return opening 76. (See FIGS. 2 and 3).

A first annular gasket 82 is connected in a conventional manner to first side 72 of base 70, and gasket 82 is positioned to sealingly engage the end edge of sidewall 66 which is adjacent to open end 64 when base 70 is positioned over and against open end 64 of container 60.

A plurality of second elements 84 project from first side 72 of base 70 in spaced apart relationship with each other, and second elements 84 are positioned between oil entry openings 78 and first annular gasket 82.

A second annular gasket 86 is positioned on second side 74 of base 70 for sealingly engaging a conventional machined portion of the engine or pump (not shown) in substantially liquid-tight relationship. Means generally designated as 87 are also provided in operative relationship with container 60 and with base 70 for removably connecting base 70 to open end 64 of container 60.

A third annular gasket 89 (see FIG. 3) is connected in a conventional manner to side 72 of base 70 and within a groove or channel 91 within side 72. Gasket 89 is substantially flush with side 72. Gasket 89 will engage end edge 45 of frustum element 42, which surrounds smaller open end 44' of the frustum element, in liquid-tight sealing relationship when base 70 is positioned over and against open end 64 of container 60.

In accordance with the invention, filter element 10 is positioned within container 60 with end member 22 of filter element 10 in liquid-tight sealing relationship against first element 68 and with second elements 84 engaging first end member 12 when base 70 is connected to open end 64 of container 60 by connecting means 87. End edge 45 of tapered sidewall 46 adjacent to smaller open end 44' of frustum element 42 also contacts gasket 89 on side 72 of base 70 in liquid-tight sealing relationship when base 70 is connected to open end 64 of container 60 by connecting means 87.

Base 70 is preferably circular in configuration and defines an outer circumference 88. Connecting means 87 preferably include a first plurality of locking elements or tabs 90 which project outwardly from base circumference 88. Connecting means 87 further include a second plurality of locking elements or buckles 92 attached to sidewall 66 of container 60 adjacent to open end 64 for releasably engaging locking tabs 90. Tabs 90 and buckles 92 are conventional fasteners.

In accordance with the invention, connecting means 87 further include pin members 94 which are attached to each of locking elements or buckles 92 and which project beyond open end 64 of container 60. Pin member-receiving openings 96 are defined within each of locking elements or tabs 90 for slideably receiving pin members 94 therein when base 70 is positioned over and against open end 64 of container 60.

Second elements 84 are located in substantial alignment with outer perimeter surface 14 of filter element 10 when filter element 10 is removably positioned within container 60. This is best seen in FIG. 1. Each of second elements 84 projects from first side 72 of base 70 by a distance less than the previously mentioned third predetermined distance dimension of flap member 52 but equal to the previously mentioned second predetermined distance dimension by which frustum element 42 projects outwardly from annular surface 30. As a result, flap member 52 can flexibly move to rest against second elements 84 and against a portion of first side 72 of base 70 to prevent oil draining outwardly through oil entry openings 78 and through oil return opening 76 from the space between filter material 40 and side wall 66 when container 60 and base 70 are removed from the engine or pump with base 70 still connected to container 60.

Second side 74 of base 70 preferably defines a continuous and substantially circular channel 98 which is located between oil entry openings 78 and locking elements or tabs 90. Channel 98 removably receives and holds gasket 86 therein by friction. Gasket 86 can be removed from channel 98 and a new gasket substituted whenever filtering system 58 is removed from the engine or pump. This will assure a liquid-tight seal between the engine or pump and base 70 when system 58 is replaced on the engine or pump.

In use, filter element 10 is positioned within container 60, as previously described, with element 68 engaging annular channel 37 in liquid-tight sealing relationship. Base 70 is then positioned over and against open end 64 of container 60 with gasket 82 contacting end edge 67 of sidewall 66 adjacent to open end 64 in liquid-tight sealing relationship. Base 70 must be oriented in a position to enable pin members 94 to slideably engage openings 96 within locking elements or tabs 90. Locking elements or buckle locks 92 then engage locking elements or tabs 90 in a conventional manner to hold base 70 in liquid-tight sealing relationship against open end 64 of container 60 and with end 45 of tapered sidewall 46 in liquid-tight sealing relationship against gasket 89 on side 72 of base 70.

Oil is then applied along the outer surface of gasket 86 in a conventional manner, and liquid filtering system 58 is connected to the engine or pump (not shown) by threadably engaging threaded oil return opening 76 with a conventional threaded nipple (not shown) on the engine or pump. Assembly 58 is rotated as the threaded nipple engages threaded oil return opening 76, and assembly 58 is rotated until gasket 86 contacts a conventional machined portion of the engine or pump (not shown) in a liquid-tight sealing manner. The oil applied to the outer surface of gasket 86 ensures a liquid-tight seal with the engine or pump.

As the engine or pump operates and as oil is circulated through the engine or pump and through assembly 58, the oil enters system 58 through oil entry openings 78. The oil then passes around and between second elements 84. The force of the oil causes flexible flap member 52 to rotate or move about its point of connection to end member 12 so that oil is allowed to pass around flap member 52.

The oil then passes between filter material 40 and sidewall 66 of container 60 and then through filter material 40. The oil must pass through filter material 40 because the smaller end of frustum element 42 engages gasket 89 on side 72 of base 70 in liquid-tight sealing relationship and end member 22 engages first element 68 in continuous liquid-tight sealing relationship.

As the oil passes through filter material 40 and around magnetized rod elements 56, ferrous particles within the oil are removed from the oil and are attracted to and held by rod elements 56. The oil also passes through openings in a conventional perforated cylindrical center support (not shown), made of plastic or metal, which is positioned inside of filter material 40 to support filter material 40 and to prevent filter material 40 from tearing or bursting. The perforated cylindrical center support is connected to and extends between surfaces 32 and 36. The oil then passes through interior opening 18 of filter element 10 and outwardly through oil return opening 76 within base 70 to be returned to the engine or pump.

If filter material 40 becomes clogged or if oil can not pass through filter material 40 because of the low temperature and high viscosity of the oil, it is important that oil continue to flow through the engine or pump during its operation to avoid damage to the engine or pump. Accordingly, this invention provides a simple and effective bypass valve 38 which allows oil to bypass filter material 40 if oil pressure within system 58 reaches a predetermined value. When this occurs, the pressure of the oil acts against spring-like tab elements 51 of spring member 50 to force the tab elements away from openings 48 within sidewall 46 of frustum element 42. Tab elements 51 are resiliently connected to annular element 55 of spring member 50 so that the tab elements normally are resiliently biased firmly against inner surface 53 of sidewall 46 to close sidewall openings 48 in liquid-tight sealing relationship. When the oil pressure reaches a predetermined value, however, the force of the oil acts against spring tab elements 51 so that they are moved away from openings 48. As a result, oil then flows directly from oil input or entry openings 78, through sidewall openings 48 and outwardly through oil return opening 76. Thus, the flow of the oil bypasses filter material 40, and damage to the engine or pump is avoided even though oil is not able to pass through filter material 40.

If the temperature of the oil increases and its viscosity decreases so that it can pass through filter material 40, the oil pressure within the system will then decrease sufficiently to permit spring tab elements 51 to resiliently spring back into firm engagement with inner surface 53 of sidewall 46 to cover sidewall openings 48 in liquid-tight sealing relationship. Oil will then pass through filter material 40 and will no longer flow through bypass valve 38.

When it is determined that a new filter element 10 should replace the existing filter element within system 58, the assembly comprised of container 60 and base 70 is unscrewed from the engine or pump in a conventional manner. Pin members 94 engaging openings 96 enable the unitary assembly of container 60 and base 70 to be unscrewed from the engine or pump by grasping only container 60. Twisting forces applied to container 60 are transferred to base 70 through pin members 94.

When assembly 58 has been removed from the engine or pump and if it is tipped toward base 70, the weight of oil within container 60 that is trapped between filter material 40 and sidewall 66 of container 60 will cause movement of anti-drain back flap member 52 against elements 84 and against a portion of side 72 of base 70. This will prevent the trapped oil from draining out of container 60 and through openings 76, 78.

After the assembly of container 60 and base 70 has been removed from the engine or pump, the assembly can be readily positioned with base 70 up so that oil will not spill or drain from container 60 when base 70 is removed from the container. Base 70 is removed from container 60 by unfastening buckle locks 92 from locking elements 90 and by removing base 70 from container 60. Filter element 10 within container 60 can then be quickly and easily removed from the container and oil within the container can be drained from the container in a neat and spill-free manner. Filter element 10 can then be discarded and a new filter element 10 can be replaced within container 60. Base 70 is then reconnected to and sealed in relationship with container 60 as previously described. Gasket 86 is removed by hand or by a tool, such as a screwdriver, from channel 98 in base 70, and a new gasket 86 is positioned within channel 98. Gasket 86 is sized to friction-fit and to be held within channel 98. Assembly 58 is then reconnected to the engine or pump in the manner previously described.

Container 60 and base 70 are preferably stamped out of steel or aluminum plate and oil return opening 76 has internal female threads which engage with external male threads on the conventional nipple of the motor or pump (not shown).

This invention provides for a reusable liquid filtering system which uses a disposable liquid filter element having a simplified and reliable bypass valve built into the filter element. The liquid filtering system reduces the amount of waste motor oil being disposed of in dumps and landfills, and use of the filtering system described herein will reduce oil contamination of the ground and water in and around landfills. The liquid filtering system is more economical than conventional oil filters because only the filtering element of the system described herein is discarded, rather than the entire filtering assembly. The liquid filtering system described herein also can be quickly and easily attached to and removed from an engine or pump without spillage of oil.

The filtering system of this invention has been described for use as an oil filter unit with internal combustion engines and pumps, but the system can also be used to filter oil in other environments. The system can also be used to filter liquids other than oil.

The invention in its broader aspects is not limited to the specific details shown and described, and departures may be made from such details without departing from the principles of the invention and without sacrificing its chief advantages.

What is claimed is:

1. A liquid filter, comprising:
   a first annular end member of a predetermined material defining a first outer perimeter surface and an opposed first inner perimeter surface spaced radially inwardly from said first outer perimeter surface by a first predetermined distance, said inner perimeter surface defining a perimeter of a first interior opening;
   a second end member of predetermined material defining a second outer perimeter surface;
   said first end member further defining a first annular surface extending between said first outer perimeter surface and said first inner perimeter surface and a second annular surface opposed from said first annular surface and extending between said first outer perimeter surface and said first inner perimeter surface;
   said second end member further defining a third surface connected with said second outer perimeter surface and a fourth surface opposed from said third surface and connected with said second outer perimeter surface;
   a substantially cylindrically configured filter material connected to and extending between said second annular surface and said fourth surface; and
   a liquid bypass valve connected to said first annular surface around said first interior opening and projecting outwardly from said first annular surface, said bypass valve including:
   a hollow conical frustum element defining first and second opposed open ends and a tapered sidewall extending between said open ends, said frustum element connected at said first open end thereof to said first annular surface around said first interior opening and projecting outwardly from said first annular surface by a second predetermined distance, said first open end having a diameter greater than a diameter of said second open end;
   said sidewall defining a plurality of openings therein and an inner sidewall surface; and
   a spring member connected to said first annular surface and defining a plurality of tab elements positioned for normally resiliently engaging said inner sidewall surface and covering said plurality of openings in substantially liquid-tight sealing relationship.

2. A liquid filter as in claim 1 wherein said spring member further includes an annular element embedded within said first end member, said annular element resiliently connected to said tab elements.

3. A filter element as in claim 2 further including an annular flap member flexibly connected to said first end member and projecting beyond said first outer perimeter surface by a third predetermined distance.

4. A filter element as in claim 3 further including at least one magnetized rod element extending between and connected to said first and second end members for attracting and holding ferrous metal particles and for providing said filter element with structural strength.

5. A liquid filter as in claim 4 wherein said third surface defines an annular channel therein.

6. A liquid filter as in claim 5 wherein said second end member is a solid member.

7. A reusable liquid filtering system for use with an internal combustion engine or pump, said system comprising:
- a container having a first closed end, a second opposed open end and defining a substantially cylindrical sidewall extending between said first and second ends;
- a first element projecting inwardly from said first closed end;
- a base having first and second opposed sides and defining a centrally positioned threaded oil return opening and a plurality of oil entry openings spaced radially outwardly from said oil return opening;
- a first annular gasket connected to said first side of said base and positioned to selectively engage said cylindrical sidewall of said container when said base is positioned over and against said second open end of said container;
- a plurality of second elements projecting from said first side of said base in spaced apart relationship with each other and positioned between said oil entry openings and said first annular gasket;
- a second annular gasket positioned on said second side of said base for sealingly engaging said engine or said pump in substantially liquid-tight relationship;
- means in operative relationship with said container and with said base for removably connecting said base to said second open end of said container; and
- said liquid filter as described in claim 5 removably positioned within said container with said second end member of said liquid filter in substantially liquid-tight sealing relationship with said first element, with said second elements engaging said first end member of said filter element and with said tapered sidewall of said frustum element engaging said first side of said base in normally substantially liquid-tight sealing relationship when said base is connected to said second open end of said container by said connecting means.

8. A liquid filtering system as in claim 7 wherein said base is substantially circular having an outer circumference and wherein said connecting means include:
- a first plurality of locking elements projecting outwardly from said base circumference; and
- a second plurality of locking elements attached to an outer surface of said cylindrical sidewall adjacent to said second open end for releasably engaging said first plurality of locking elements.

9. A liquid filtering system as in claim 8 wherein said connecting means further include a plurality of pin members attached to said second locking elements and projecting beyond said second open end of said container, and a plurality of pin member-receiving openings defined within said first plurality of locking elements for slidably receiving said pin members when said base is positioned over and against said second open end of said container.

10. A liquid filtering system as in claim 8 wherein said flap member of said filter is positionable against said second elements and against said first side of said base to act as an anti-drain back feature to prevent oil from draining from inside said container between said filter material and said container sidewall outwardly through said oil entry opening and through said oil return opening.

11. A liquid filtering system as in claim 10 wherein said plurality of second elements are located in substantial alignment with said first outer perimeter surface of said filter element when said filter element is removably positioned within said container.

12. A liquid filtering system as in claim 11 wherein each of said plurality of second elements projects from said first side of said base by said second predetermined distance which is less than said third predetermined distance, whereby said flap member can flexibly move to rest against said second elements and against said first side of said base to prevent oil draining outwardly through said oil entry openings and through said oil return opening when said container and said base are removed from said engine or said pump with said base connected to said container.

13. A liquid filtering system as in claim 12 wherein said first element is continuous and substantially circular.

14. A liquid filtering system as in claim 13 wherein said second side of said base defines a continuous and substantially circular channel located between said oil entry openings and said first plurality of locking elements for removably receiving and holding said second gasket therein.

* * * * *